(12) United States Patent  
Sun et al.

(10) Patent No.: US 10,979,655 B2  
(45) Date of Patent: Apr. 13, 2021

(54) MULTI-PURPOSE INFRARED IMAGING DEVICE

(71) Applicant: WUHAN GUIDE INFRARED CO., LTD, Wuhan (CN)

(72) Inventors: Xuhui Sun, Wuhan (CN); Lidong Yang, Wuhan (CN); Li Huang, Wuhan (CN); Peng Wang, Wuhan (CN); Zhihong Liu, Wuhan (CN); Chao Huang, Wuhan (CN); Hanlin Zhou, Wuhan (CN); Lingzhi Chen, Wuhan (CN)

(73) Assignee: WUHAN GUIDE INFRARED CO., LTD, Wuhan (CN)

( * ) Notice: Subject to any disclaimer, the term of this patent is extended or adjusted under 35 U.S.C. 154(b) by 47 days.

(21) Appl. No.: 16/325,639

(22) PCT Filed: Aug. 15, 2017

(86) PCT No.: PCT/CN2017/097549  
§ 371 (c)(1),  
(2) Date: Feb. 14, 2019

(87) PCT Pub. No.: WO2018/033076  
PCT Pub. Date: Feb. 22, 2018

(65) Prior Publication Data  
US 2019/0215468 A1  Jul. 11, 2019

(30) Foreign Application Priority Data  
Aug. 15, 2016 (CN) .......................... 201620878536.8

(51) Int. Cl.  
*H04N 5/33* (2006.01)  
*H04N 5/225* (2006.01)

(52) U.S. Cl.  
CPC ............. *H04N 5/33* (2013.01); *H04N 5/2252* (2013.01); *H04N 5/2253* (2013.01); *H04N 5/2254* (2013.01); *H04N 5/22525* (2018.08)

(58) Field of Classification Search  
None  
See application file for complete search history.

(56) References Cited

U.S. PATENT DOCUMENTS

| 6,724,428 B1 * | 4/2004 | Goh ......................... G03B 9/06 |
| | | 348/373 |
| 2017/0171371 A1 * | 6/2017 | Jannard ................ H04N 5/2252 |

FOREIGN PATENT DOCUMENTS

| CN | 102801912 A | 11/2012 |
| CN | 103528693 A | 1/2014 |

(Continued)

*Primary Examiner* — Heather R Jones  
(74) *Attorney, Agent, or Firm* — Maschoff Brennan

(57) ABSTRACT

The present invention relates to infrared imaging, providing a multi-purpose infrared imaging device. The multi-purpose infrared imaging device comprises a housing. An optical lens module is mounted at a front end of the housing. The housing has an opening. A power module for blocking the opening is detachably mounted in the housing. An infrared sensor module, an infrared signal processing module and an infrared digital image processing module are further mounted in the housing, and both of the infrared sensor module and the infrared digital image processing module are electrically connected to the infrared signal processing module and all of the three modules are electrically connected to the power module. The power module, the infrared sensor module, the infrared signal processing module and the infrared digital image processing module are integrated in the housing in the imaging device, such that the imaging device has multiple functions to effectively meet the multi-functional needs of users. Moreover, the structure of each part is mounted to the housing in a modular form, making it (Continued)

very convenient for installation, disassembly and maintenance.

10 Claims, 4 Drawing Sheets

(56) References Cited

FOREIGN PATENT DOCUMENTS

| | | |
|---|---|---|
| CN | 204733293 U | 10/2015 |
| CN | 205961273 U | 2/2017 |
| CN | 206077535 U | 4/2017 |
| EP | 0 493 170 A1 | 7/1992 |

* cited by examiner

MULTI-PURPOSE INFRARED IMAGING DEVICE

TECHNICAL FIELD

The present invention relates to infrared imaging, and more particularly to a multi-purpose infrared imaging device.

BACKGROUND ART

With the continuous development of uncooled infrared detector technology, infrared thermal imaging devices are becoming smaller and smaller, and their productization and user range are also expanding. It is desirable to have infrared thermal imaging products having multifunction and multiple applications (for example, temperature measurement, being vehicle-mounted, security and protection, outdoor, sports). Currently, commonly used infrared thermal imaging devices (for example, infrared cameras, infrared video cameras and infrared thermal imagers), are usually independent products having only a single function, or installed in a large system, or configured as an application in a portable device. In addition, due to the limitation of the size of present infrared thermal imaging device, the capacity of the internal power supply of the product cannot meet the long-term use requirement of the product itself, making the device have poor endurance.

SUMMARY OF THE INVENTION

It is an object of the present invention to provide a multi-purpose infrared imaging device that is intended to solve the problem of relatively simple function of the existing infrared thermal imaging device.

The invention is implemented as follows.

An embodiment of the present invention provides a multi-purpose infrared imaging device including a housing. An optical lens module is disposed at a front end the housing. The housing has an opening. A power module for blocking the opening is detachably mounted in the housing. An infrared sensor module, an infrared signal processing module and an infrared digital image processing module are further mounted in the housing, and both of the infrared sensor module and the infrared digital image processing module are electrically connected to the infrared signal processing module and all of the three modules are electrically connected to the power module. Further, an extra power module is included, with the extra power module being clamped to the power module.

Further, a display and button group module is included, wherein the display and button group module includes a display screen and a button group. The display screen and the button group are both mounted to the housing via a display screen bracket, and the circuit board of the infrared digital image processing module is electrically connected to the display screen and the button group respectively via a flexible flat cable.

Specifically, the button group includes a power switch and a photo taking and video recording key.

Further, the infrared signal processing module is electrically connected to the signal panel of the infrared sensor module via an electrical socket.

Further, the optical lens module is threadedly connected to the housing.

Further, the optical lens module includes a decorative ring and a lens, and the lens is mounted to the decorative ring, and the decorative ring is threadedly connected to a front end of the housing.

Further, a WIFI antenna stack is further included, wherein the WIFI antenna stack is disposed on the inner side of the housing, and the circuit board of the infrared digital image processing module is electrically connected to the WIFI antenna stack.

Further, the infrared sensor module includes an infrared detector device and a solenoid valve shutter assembly, and the signal panel of the infrared detector device and the solenoid valve shutter assembly are integrated on a detector holder, and the detector holder is bolted to the housing.

Further, a mechanical interface and/or an electrical interface and/or a physical transfer interface are further disposed on the housing.

The invention has the following beneficial effects:

In the imaging device of the present invention, an optical lens module is disposed outside the housing, and a power module, an infrared sensor module, an infrared signal processing module and an infrared digital image processing module are disposed inside the housing. The imaging device can have various functions by integrating an infrared camera, an infrared video camera and an infrared thermal imager to meet the multi-functional needs of users. In addition, each part is mounted to the housing in modular form, and each module is electrically connected to each other, making it very convenient to mount and detach.

BRIEF DESCRIPTION OF THE DRAWINGS

In order to illustrate the embodiments of the present invention or technical solutions in the prior art more clearly, the drawings used to describe the embodiments or the prior art will be briefly introduced below. Apparently, the drawings in the following description are only some of the embodiments of the present invention, and those skilled in the art can obtain other drawings according to the drawings without any creative work.

DETAILED DESCRIPTION OF THE INVENTION

The technical solutions of the embodiments of the present invention will be clearly and completely described in the following with reference to the accompanying drawings of the embodiments of the present invention. It is apparent that the described embodiments are only a part, not all of the embodiments of the invention. All other embodiments obtained by a person of ordinary skill in the art based on the embodiments of the present invention without creative efforts are within the scope of the present invention.

Figure 1:
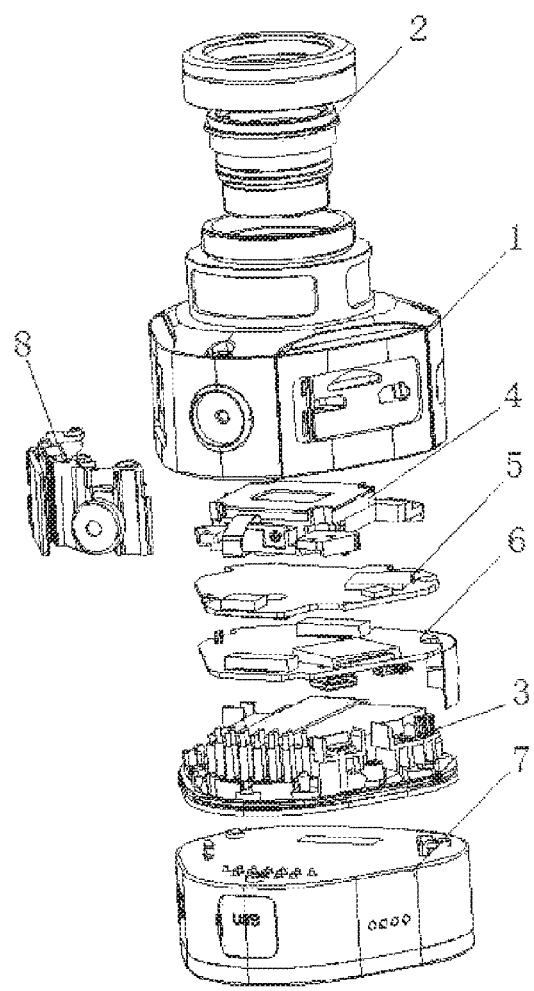
FIG. 1 is a schematic structural view of a multi-purpose infrared imaging device provided by an embodiment of the present invention.
Figure 2:
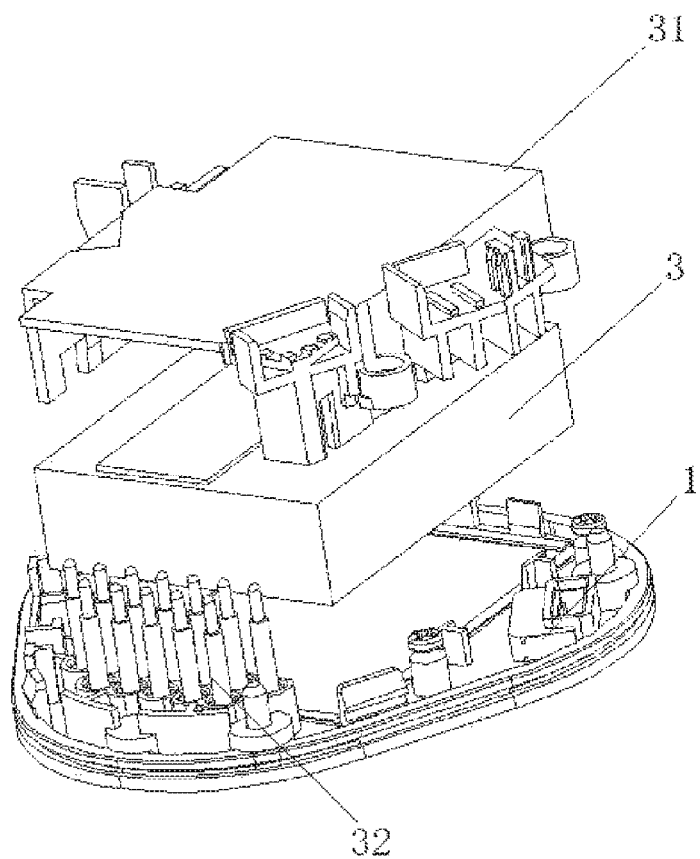
FIG. 2 is a schematic structural view of a power module of the multi-purpose infrared imaging device of FIG. 1.

Referring to FIG. 1 and FIG. 2, an embodiment of the present invention provides a multi-purpose infrared imaging device including a housing 1 with an optical lens module 2 arranged at a front end thereof, wherein of course, an infrared optical lens is generally used. The housing 1 is composed of and structured by multiple parts, and each part is detachably connected and enclosed to form a chamber. An opening is disposed on the housing corresponding to the chamber to install a power module 3, an infrared sensor module 4, an infrared signal processing module 5 and an infrared digital image processing module 6 in the chamber of the housing 1, wherein the power module 3 is detachably mounted to the opening of the housing 1 to block the opening, thereby making the chamber a relatively sealed space. The power module 3 is mainly fixed on the inner wall of the rear end of the housing 1 by a plastic bracket 31, wherein the power module 3 is an energy unit of the imaging device, and the infrared sensor module 4, the infrared signal processing module 5 and the infrared digital image processing module 6 are all electrically connected to the power module 3, and the infrared sensor module 4 and the infrared digital image processing module 6 are both electrically connected to the infrared signal processing module 5 to realize the functions of each part. In this embodiment, the infrared sensor module 4, the infrared signal processing module 5 and the infrared digital image processing module 6 are integrated in the housing 1, and with the combination of the optical lens module, the imaging device integrates into an infrared camera, an infrared video camera and an infrared thermal imager to meet the needs of users for multi-function infrared devices, making it more convenient to carry compared with three devices otherwise. In addition, in the housing 1, each function is embodied in the form of modules, making it very convenient to install and disassemble.

Figure 3:
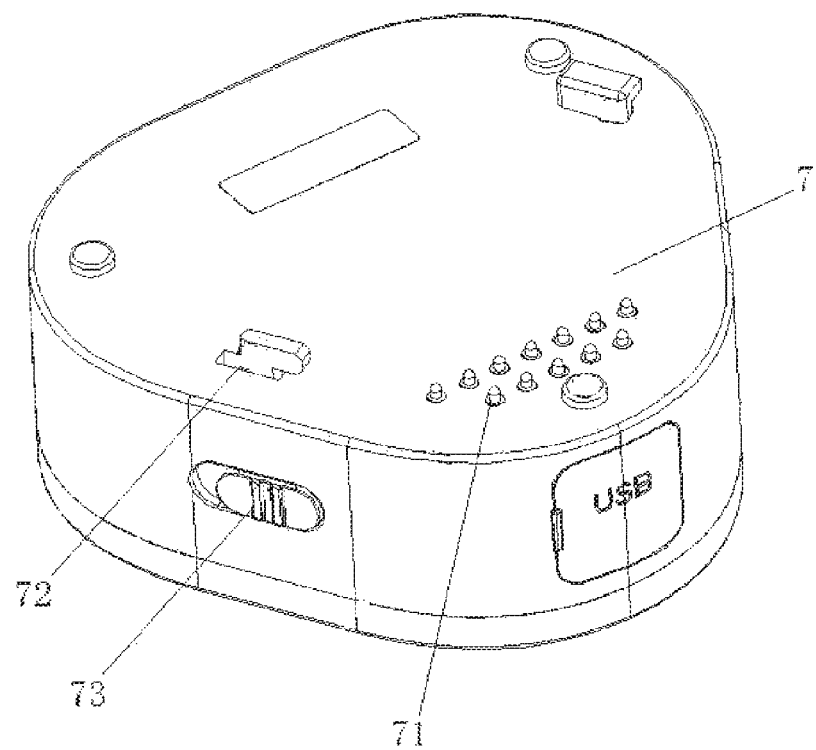
FIG. 3 is a schematic structural view of an extra power module of the multi-purpose infrared imaging device of FIG. 1.

Referring to FIG. 1 and FIG. 3, the above embodiment is optimized for the imaging device further includes an extra power module 7, wherein the extra power module 7 is a separate part and can be clamped to the power module 3 to be used with the power module 3. In this embodiment, the extra power module 7 is used as an accessory of the imaging device to provide power for it. The extra power module 7 is connected to the power module 3 in the housing 1 via an exposed pogopin metal probe 71 and a movable double buckle 72, wherein the movable double buckle 72 is controlled by a buckle driving lever 73 to be locked and opened, which is very convenient. Specifically, an electrical expansion interface is disposed at a rear end of the housing 1 corresponding to the power module 3, and the extra power module 7 is connected to the electrical expansion interface by the pogopin metal probe 71 for implementing a good endurance function of the imaging device, so that it can be used for a longer time than before.

Figure 4:
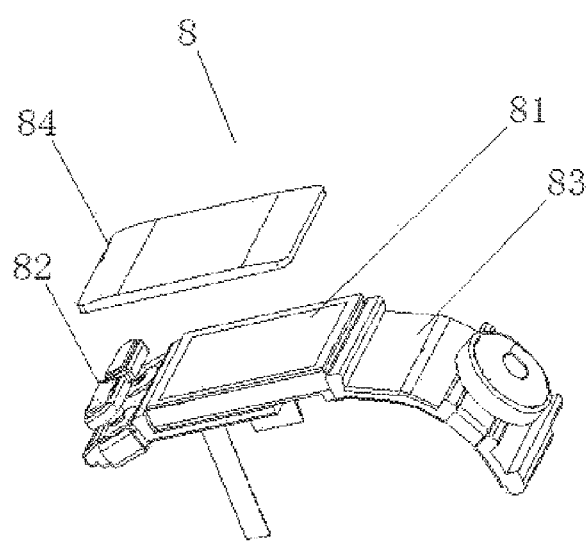
FIG. 4 is a schematic structural view of a display and button group module of the multi-purpose infrared imaging device of FIG. 1.

Referring to FIG. 1 and FIG. 4, the imaging device further includes a display and button group module 8, the display and button group module 8 including a display screen 81 and a button group 82. The display screen 81 and the button group 82 are both mounted to the housing 1 via the display bracket 83, and the display screen 81 and the button group 82 may be mounted to or detached from the housing 1 as a whole. The circuit board of the infrared digital image processing module 6 is electrically connected to the display screen 81 and the button group 82 respectively via a flexible flat cable. In this embodiment, the imaging device is additionally provided with a display function, and the display screen 81 can display part of the working state of the imaging device, making it convenient for users to use the imaging device. The display screen 81 can be designed with a touch screen for it to have an operation function. Generally, a protective plate 84 is further disposed on the surface of the display screen 81 for protecting the display screen 81. The button group 82 includes a power switch and a photo taking and recording button. And when a WIFI antenna stack is disposed inside the housing 1, the button group 82 further includes a WIFI match code key. The WIFI match code key is used together with the WIFI antenna stack such that the imaging device has a wireless transmission function, and the circuit board of the infrared digital image processing module 6 is electrically connected to the WIFI antenna stack via wires such that it can transmit information to and from the outside world. A signal for the WIFI antenna stack can be displayed on the display screen 81. And of course, when the display screen 81 is a touch screen, the WIFI match code key can be integrated to the display screen 81.

Figure 5:
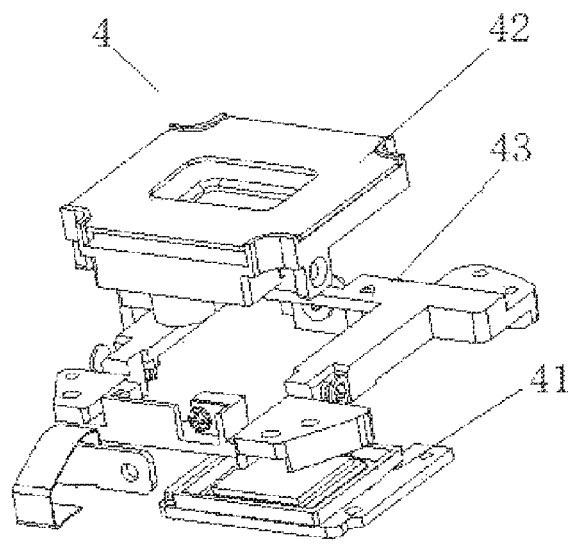
FIG. 5 is a schematic structural view of an infrared sensor module of the multi-purpose infrared imaging device of FIG. 1.

Referring to FIG. 1 and FIG. 5, further, the infrared sensor module 4 includes an infrared detector device and a solenoid valve shutter assembly 42. The signal panel 41 of the infrared detector device and the solenoid valve shutter assembly 42 are both integrated into the detector holder 43, and the detector holder 43 is bolted to the housing 1. The infrared sensor module 4 can be detached and mounted as a whole, which is very convenient. In addition, the infrared signal processing module 5 is electrically connected to the above-mentioned signal panel 41 via an electrical socket, thereby achieving signal transmission between the two.

Figure 6:
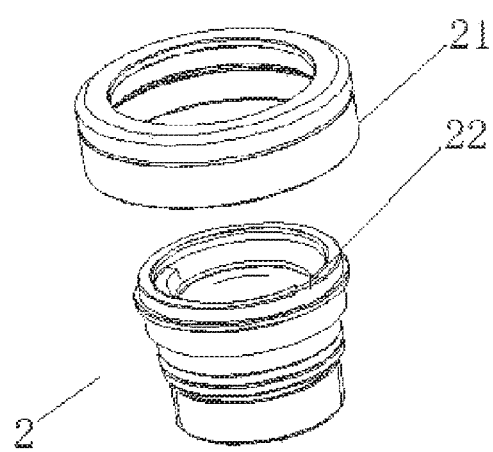
FIG. 6 is a schematic structural view of an optical lens module of the multi-purpose infrared imaging device of FIG. 1.

Referring to FIGS. 1 and 6, further, a threaded connection is made between the optical lens module 2 and the housing 1. The focus mode of the optical lens module 2 is fixed focus, and the lens adopts an athermal design. In the high and low temperature environment, the focal length of the lens 21 does not need to be adjusted. When installed, the optical lens module 2 is mainly divided into two parts, a decorative ring 22 and a lens 21, wherein, the lens 21 is mounted to the decorative ring 22, and the decorative ring 22 is threadedly connected to the front end of the housing 1, and the decorative ring 22 is primarily used to decorate and limit the lens 21.

Referring to FIG. 1, FIG. 2 and FIG. 4, further, a mechanical interface and/or an electrical interface and/or a physical transfer interface are further disposed on the housing 1, that is, various interfaces are disposed on the housing 1 to cope with different demands. Specifically, the mechanical interface is mainly used for structurally fixing extended spare parts, such as a backup battery, a GPS module, an eyepiece, a display screen 81, and a video output adaptor, etc., and a pogopin metal probe 32 is assembled on the inner side of the rear end of the housing 1 for the breakover of various infrared processing modules and external expansion accessories, and an alignment groove and a limiting groove for assembling expansion accessories are reserved for mechanically fixing the external expansion accessory; the electrical interface is used to electrically connect the device and the extended spare parts, the output electrical signal mainly including: extended battery power input, GPS module serial signals, battery power output and analog video signal output, etc., and a communication interface Micro USB, a video output interface microHDMI, and a storage interface Micro SD card slot are disposed at the corresponding infrared digital image processing module 6 of the housing 1; after assembled with custom adaptors, the physical transfer interface is compatible with other sports camera accessories on the market, such as vehicle docks, bicycle fixed mounts, mobile phone brackets and drone mounts. With the above interfaces, the imaging device can be connected with various extended spare parts so that the functions of temperature measurement display, high-definition video output and power energy endurance can be realized, and it thus immediately changes into professional equipment such as a hand-held infrared thermal imager and a wearable infrared sports camera, and it can be fixed on cars and drones as an infrared filming tool.

The above is only preferred embodiments of the present invention, and is not intended to limit the present invention. Any modifications, equivalent substitutions, improvements, etc., included in the spirit and scope of the present invention, should be within the scope of the protection of the present invention.

The invention claimed is:

1. A multi-purpose infrared imaging device, comprising:
    a housing having an optical lens module mounted at a front end thereof, wherein:
        the housing is composed of and structured by multiple parts, and each part of the multiple parts is detachably connected and enclosed to form a chamber;
        an opening is disposed on the housing corresponding to the chamber;
        a power module for blocking the opening is detachably mounted in the chamber of the housing;
        an infrared sensor module, an infrared signal processing module and an infrared digital image processing module are further mounted in the chamber of the housing; and
        both of the infrared sensor module and the infrared digital image processing module are electrically connected to the infrared signal processing module and all of the three modules are electrically connected to the power module.

2. The multi-purpose infrared imaging device according to claim 1, further comprising the device further comprises an extra power module, wherein the extra power module is clamped to the power module.

3. The multi-purpose infrared imaging device according to claim 1, further comprising the device further comprises a display and button group module, wherein the display and button group module comprises a display screen and a button group both mounted to the housing via a display bracket, and a circuit board of the infrared digital image processing module is electrically connected to the display screen and the button group respectively via a flexible flat cable.

4. The multi-purpose infrared imaging device according to claim 3, wherein the button group comprises a power switch and a photo taking and video recording key.

5. The multi-purpose infrared imaging device according to claim 1, wherein the infrared signal processing module is electrically connected to a signal panel of the infrared sensor module via an electrical socket.

6. The multi-purpose infrared imaging device according to claim 1, wherein the optical lens module is threadedly connected to the housing.

7. The multi-purpose infrared imaging device according to claim 6, wherein the optical lens module comprises a decorative ring and a lens, wherein the lens is mounted to the decorative ring and the decorative ring is threadedly connected to a front end housing.

8. The multi-purpose infrared imaging device according to claim 1, further comprising the device further comprises a WIFI antenna stack, wherein the WIFI antenna stack is mounted on an inner side of the housing, and a circuit board of the infrared digital image processing module is electrically connected to the WIFI antenna stack.

9. The multi-purpose infrared imaging device according to claim 1, wherein the infrared sensor module comprises an infrared detector device and a solenoid valve shutter assembly, and a signal panel of the infrared detector device and the solenoid valve shutter assembly are each integrated into a detector holder, wherein the detector holder is bolted to the housing.

10. The multi-purpose infrared imaging device according to claim 1, wherein a mechanical interface and/or an electrical interface and/or a physical transfer interface are further disposed on the housing.

* * * * *